United States Patent [19]
Castro et al.

[11] Patent Number: 5,464,246
[45] Date of Patent: Nov. 7, 1995

[54] INFLATABLE TUBULAR CUSHIONS FOR CRASH PROTECTION OF SEATED AUTOMOBILE OCCUPANTS

[75] Inventors: Mynor Castro, Mesa; Gershon Yaniv, Scottsdale; Dirk J. Hardtmann, Phoenix, all of Ariz.; David J. Romeo, Alpine, Wyo.

[73] Assignee: Simula Inc., Phoenix, Ariz.

[21] Appl. No.: 262,747

[22] Filed: Jun. 20, 1994

Related U.S. Application Data

[63] Continuation-in-part of Ser. No. 19,655, Feb. 19, 1993, Pat. No. 5,322,322.

[51] Int. Cl.$^6$ .................................................. B60R 21/22
[52] U.S. Cl. ............................... 280/730.2; 244/122 AG; 280/743.1; 297/216.1; 297/464
[58] Field of Search .......................... 280/730 R, 730 A, 280/743 R; 244/122 AG; 297/216.1, 216.11, 216.13, 464, 488

[56] References Cited

U.S. PATENT DOCUMENTS

| | | |
|---|---|---|
| 3,687,485 | 8/1972 | Campbell . |
| 3,844,581 | 10/1974 | Fox . |
| 3,953,049 | 4/1976 | Surace et al. . |
| 4,592,523 | 6/1986 | Herndon ......................... 297/216.1 |
| 5,251,931 | 10/1993 | Semchena et al. ................ 280/730 A |
| 5,322,322 | 6/1994 | Bark et al. ......................... 280/730 A |

FOREIGN PATENT DOCUMENTS

| | | | |
|---|---|---|---|
| 4307175 | 9/1993 | Germany ........................... | 280/730 A |
| 3-276844 | 12/1991 | Japan . | |
| 2191450 | 12/1987 | United Kingdom . | |
| 2261636 | 5/1993 | United Kingdom . | |
| WO9011914 | 10/1990 | WIPO . | |

OTHER PUBLICATIONS

Livbag Product Brochure, "Specifications for Euroflater Gas Generator and Safety Data Sheet," Aug. 1992.

*Primary Examiner*—Eric D. Culbreth
*Attorney, Agent, or Firm*—Crowell & Moring

[57] ABSTRACT

The present invention is a torso protection system having braided tubes that inflate upon side or oblique impact to protect the torso of a seated vehicle occupant. Prior to inflation, the braided tubes are mounted in the undeployed state along both sides of the occupant's seat. When an impact is detected, a gas generator generates, inflating the braided tubes. As the braided tubes inflate, their diameters increase and their lengths decrease substantially. The braided tubes then pull out of their storage locations and form bolsters on either side of the seated occupant. The inflated tubes prevent the torso of the occupant from directly colliding with interior side structures of the vehicle and restrict the lateral motion of the occupant.

33 Claims, 8 Drawing Sheets

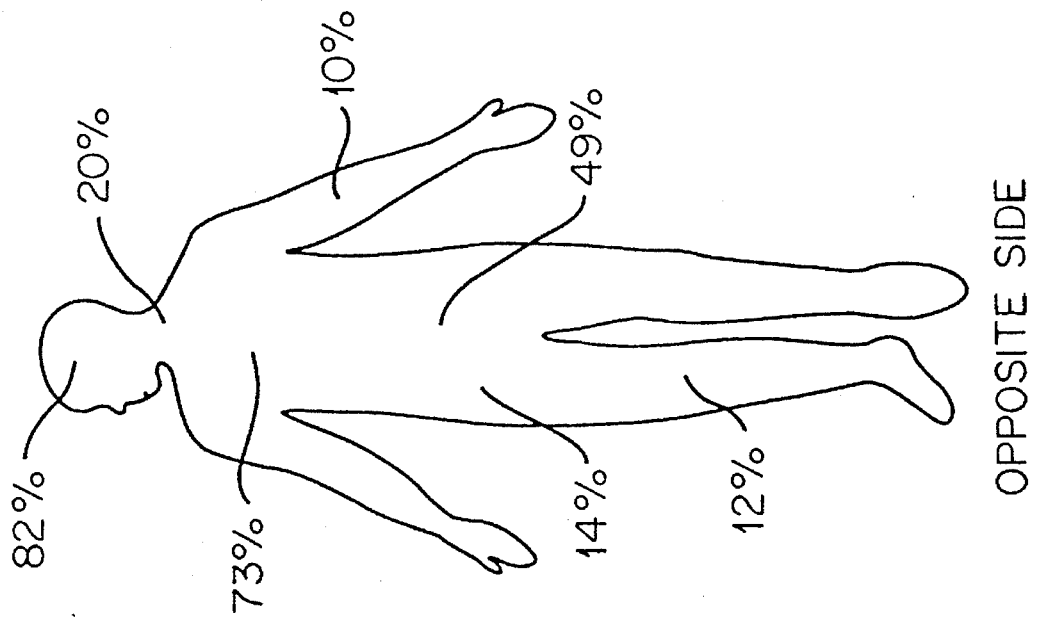
FIG. 1b  OPPOSITE SIDE
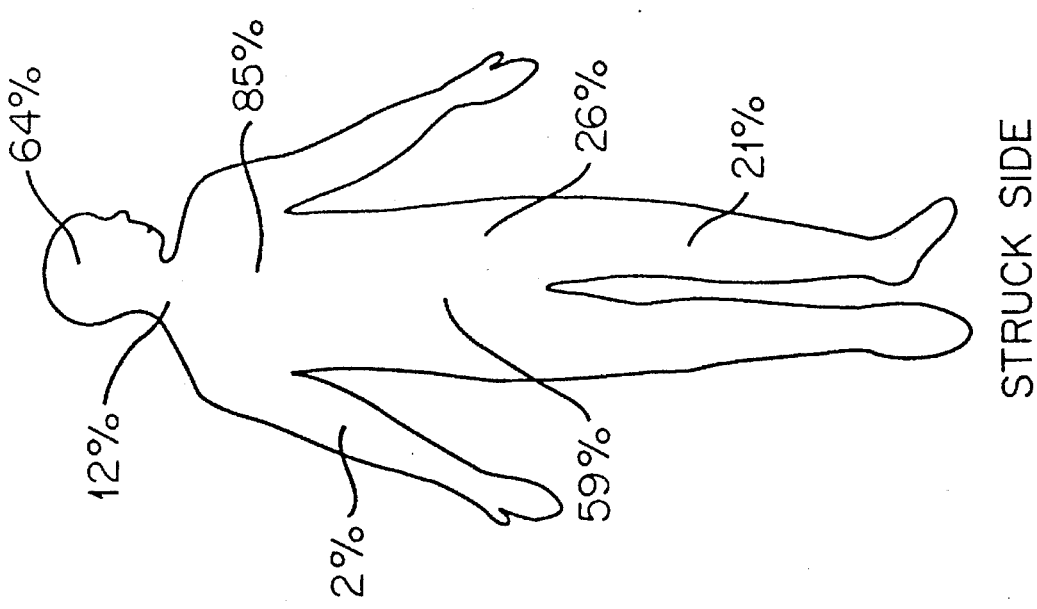
FIG. 1a  STRUCK SIDE

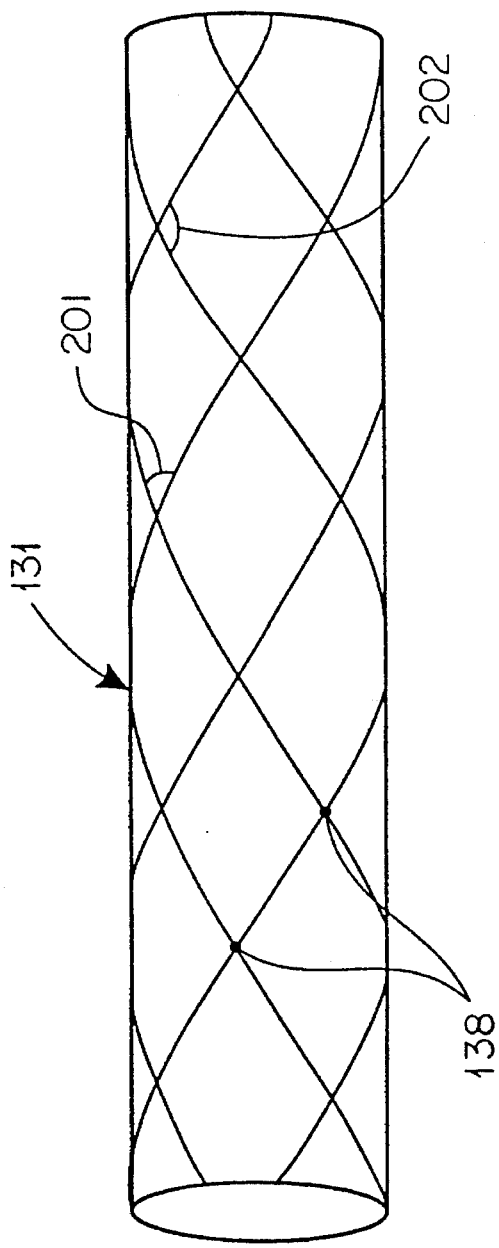
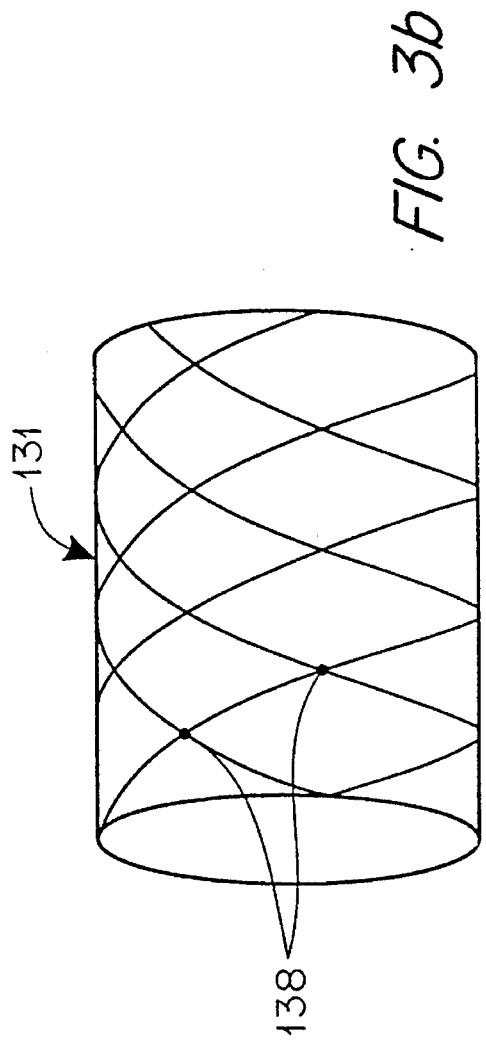
FIG. 3a
FIG. 3b

INFLATABLE TUBULAR CUSHIONS FOR CRASH PROTECTION OF SEATED AUTOMOBILE OCCUPANTS

This application is a continuation-in-part of U.S. patent application Ser. No. 08/019,655, filed on Feb. 19, 1993, to be issued as U.S. Pat. No. 5,322,322, which is incorporated by reference herein.

BACKGROUND

1. Field of the Invention

The present invention relates to safety apparatus for cushioning the body of the occupant of a vehicle to reduce the extent and severity of injuries suffered during side or oblique impact crashes. More specifically, it relates to a system of components that inflate to protect and/or cushion the torso from direct impact with the interior vehicle side structure, and to restrict the lateral motion of a vehicle occupant.

2. Background of the Invention

Side or lateral impacts are a significant cause of injuries and fatalities in automotive crashes. According to the Insurance Institute for Highway Safety (IIHS), 30 percent of all automobile occupant fatalities in the United States in 1989 involved side impact crashes.

Occupants killed in side impact crashes typically have a high incidence of torso injuries. Side impact crashes also cause severe injuries to other body regions including the head, neck, abdomen, pelvis and extremities.

FIG. 1 summarizes the distribution of injuries by body region, based on an IIHS study of 91 struck-side and 49 opposite-side fatalities in the United Kingdom in 1985. "Struck-side" refers to occupants seated on the side of the vehicle that was struck, while "opposite-side" refers to occupants who were seated on the side that was not struck. FIG. 1 shows the distribution of injuries having a severity greater than or equal to three on the Abbreviated Injury Scale (AIS) by body region for fatalities in struck-side and opposite-side crashes. According the IIHS study, 85% of struck-side occupants suffered chest injuries; 59% suffered abdomen injuries; 26% suffered pelvis injuries; 64% suffered head injuries; 12% suffered neck injuries; and 2% suffered injuries to their upper limbs and 21% to their lower limbs. FIG. 1 also shows that 73% of opposite-side occupants suffered chest injuries; 49% suffered abdomen injuries; 14% suffered pelvis injuries; 82% suffered head injuries; 20% suffered neck injuries; and 10% suffered injuries to their upper limbs and 12% to their lower limbs. The injury statistics for the struck-side and opposite-side occupants total in excess of 100% because crash victims frequently suffer from multiple injuries.

Conventional automotive safety belts and air bag systems offer inadequate torso protection in side impact crashes. These systems are generally designed to protect occupants from primary injuries sustained only in frontal impacts, or in oblique impacts up to approximately +/−30 degrees (as measured with respect to the centerline of the struck vehicle).

Federal Motor Vehicle Safety Standard "FMVSS" 214 currently defines the test procedures and performance requirements for occupant protection in side impact crashes, The dynamic requirements of FMVSS 214 have been implemented based on an escalating percentage of each manufacturer's annual production.

In response to FMVSS 214, several developments in side impact countermeasures have occurred. These countermeasures primarily include the reinforcement of side components and door structures with improved door beams, modified pillars, and improved energy-absorbing padding.

Most of these developments in response to FMVSS 214 focus on limiting the intrusion of an object into the passenger compartment. Additionally, energy-absorbing padding helps distribute the impact force to the struck-side occupant over a larger surface area. An excellent production example of these technologies is the side impact protection system incorporated into current Volvo automobiles which carries door beam loads through the front seats into the center tunnel structure.

Currently, side-impact air bag countermeasures are also being considered by several vehicle manufactures, such as Audi and General Motors. These air bags generally deploy from the door panel to provide protection for the thorax, abdomen, and pelvic regions. Volvo has disclosed a side-impact air bag that is intended for torso protection. It is housed in the seat back and is described as "about the size of a large loaf of bread." Volvo's air bag inflates when the door panel crashes into a sensing device located approximately 4 inches away from the seat structure.

These side-impact air bag systems suffer from a series of drawbacks. First, they only offer impact protection for the side of the occupant that is closest to the door. Second, side-impact air bags that deploy in the direction of the occupant may in some cases cause injuries. For example, if an occupant is leaning against the door when the air bag is triggered, he or she may suffer back, side, or kidney injuries caused by the air bag expanding against the torso, Thirds these side-impact air bag systems generally do not provide impact protection from subsequent impacts that may occur after the initial impact because they quickly deflate. Fourths they offer no means to stabilize the lateral motion of the torso, and so do not prevent or protect the occupant from injuries that may result from the recoil of the body after the initial impact. Fifth, the gas generators of these systems are generally placed in inaccessible locations (i.e. within the seat cushion or door frame) for maintenance purposes.

In light of these drawbacks, an improved side-impact torso protection system should ideally prevent or cushion the torso from directly colliding with the interior side components of a vehicle, provide continuous impact protection for possible additional side impacts during an accident, and restrain the body from substantial lateral body movement.

SUMMARY OF THE PRESENT INVENTION

The present invention is a side-impact torso protection system with inflatable tubular components integrated into the seat structure. It can be used in cars, vans, buses and trucks, as well as in other types of vehicles, such as boats, ships, trains and airplanes. It is intended to be used in addition to conventional safety belts and airbags.

The present invention uses a pair of inflatable braided tubes stored in the seat of the vehicle. When an impact is detected, the braided tubes inflate to protect the torso of the occupant from injury during side and oblique impact crashes. When inflated, they deploy on either side of a seated occupant extending diagonally from the side edge of the upper portion of the seat back to the side edge of the front portion of the seat pan. The present invention may also be deployed in frontal impacts to provide support and cushioning for secondary impacts.

In the uninflated state, each braided tube assumes a flat configuration, and is stowed within a protective sleeve that can be internally or externally attached along the side edges of the seat back and the seat pan structures. The sleeves include a weak seam that ruptures upon inflation of the braided tube. The upper end of each braided tube is pivotally mounted to the seat back structure, while each lower end is pivotally mounted to the seat pan structure. Each uninflated tube essentially follows the side contours of the seat structure and is mounted with a small amount of slack to allow for various degrees of seat recline.

Each braided tube is made of continuous high-strength fibers which wind in clockwise and counter clockwise spirals around the tube. In order to provide superior gas retention, the tube may additionally contain an inner bladder. As the braided tube inflates, the diameter of the tube increases while its length decreases significantly. As the length of the inflating structure decreases, the mounts pivot and the increasing diameter ruptures the weak seam of the protective sleeve. This allows each braided tube to pull out of its storage location and form an essentially straight line between its two anchor points. The braided tubes thereby form taut, inflated bolster members that span the side of each seat.

The braided tubes are connected to the vehicle's crash impact sensing system. When a collision occurs, a crash sensor sends a signal to the braided tube units installed in both the struck-side and opposite-side seats. The signal initiates ignition of the generator propellant, thus inflating the braided tubes in both the struck-side and opposite-side seats. The gas generators can be integrated within the base of the seat structure to facilitate sound damping, and for easier access for maintenance purposes.

The braided tubes are not air bags in the conventional sense. They operate at pressures higher than the pressures used in conventional automotive air bags, they do not deploy in the direction from which the occupant is moving, they are not vented after deployment, and they retain their position and rigidity through tensile forces throughout the crash event and for a significant time thereafter. Even after the gas has cooled, the structures remains sufficiently inflated to provide continuous torso protection for possible subsequent impacts during an accident. Because they retain their rigidity and position through tensile forces, they do not require a bearing surface. Unlike other side-impact air bags, since the inflatable tubes may be installed on both sides of the seat, the present invention provides protection for struck-side and opposite-side occupants on both sides of their torso. The inflated tubes also restrict the lateral motion of the torso to reduce injuries that may result from recoils after the initial impact.

Accordingly, it is an object of the present invention to provide protective apparatus that inflates to protect struck-side and opposite-side occupants of a vehicle in a side or oblique impact crash or a rollover accident.

It is another object of the present invention to provide a system of inflatable components that protect the torso of an occupant from direct impact with interior vehicle structures.

It is another object of the present invention to provide a system of inflatable components that restricts the lateral motion of an occupant during a crash.

It is another object of the present invention to provide a system of inflatable components that are not vented and are maintained at a sufficiently high pressure to provide continuous protection in case of additional impacts or rollovers.

These and other objects of the present invention are described in greater detail in the detailed description, the appended drawings, and the attached claims.

BRIEF DESCRIPTION OF THE DRAWINGS

FIG. 1 shows the distribution of injuries by body region for struck side and opposite side crashes using the Abbreviated Injury Scale (AIS).

FIG. 3a shows the braided tube used in the present invention in the uninflated state.

FIG. 3b shows the braided tube used in the present invention in the inflated state.

DETAILED DESCRIPTION OF PREFERRED EMBODIMENTS OF THE INVENTION

Figure 2A:
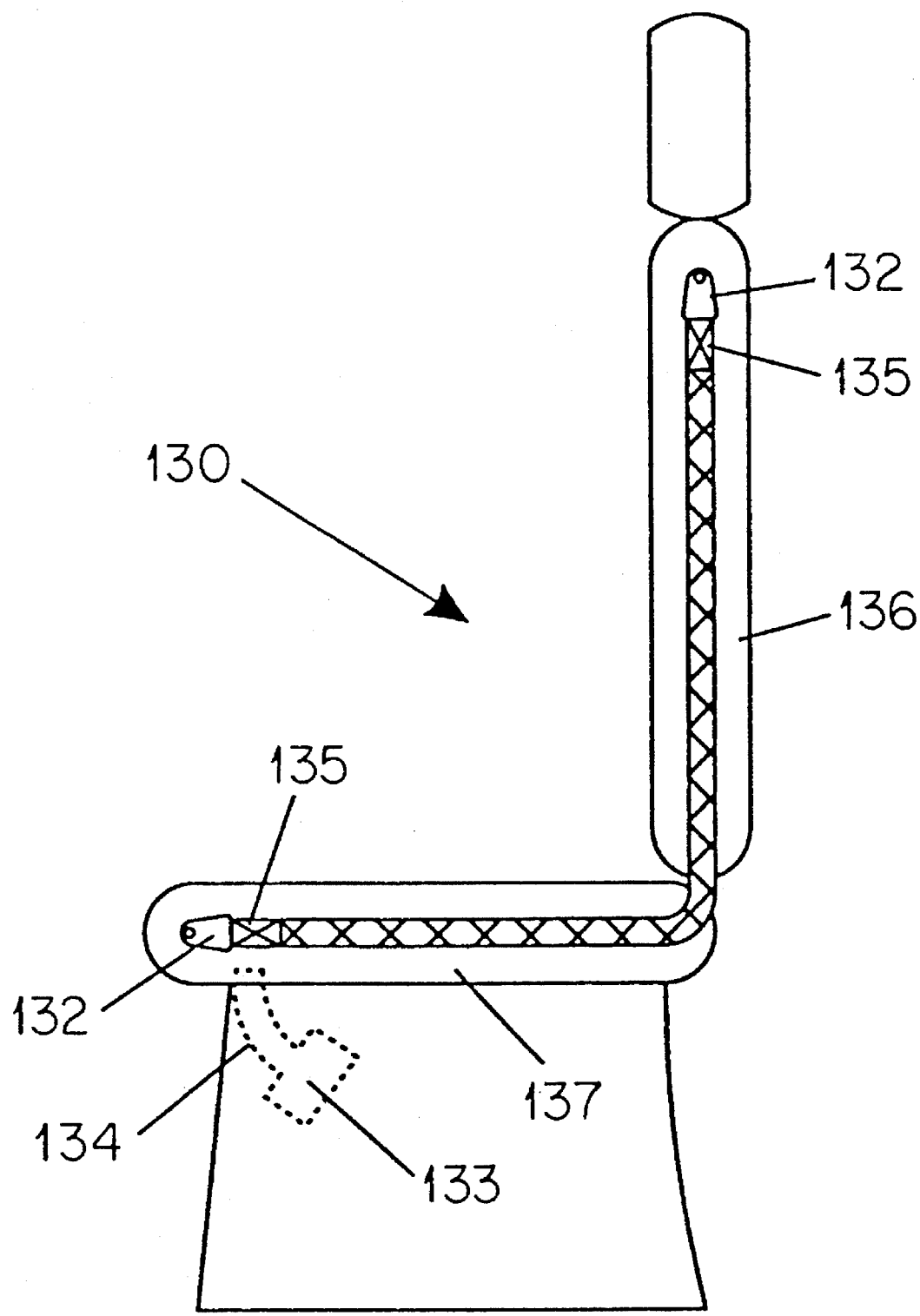
FIG. 2a is a side view of the present invention prior to inflation.
Figure 2B:
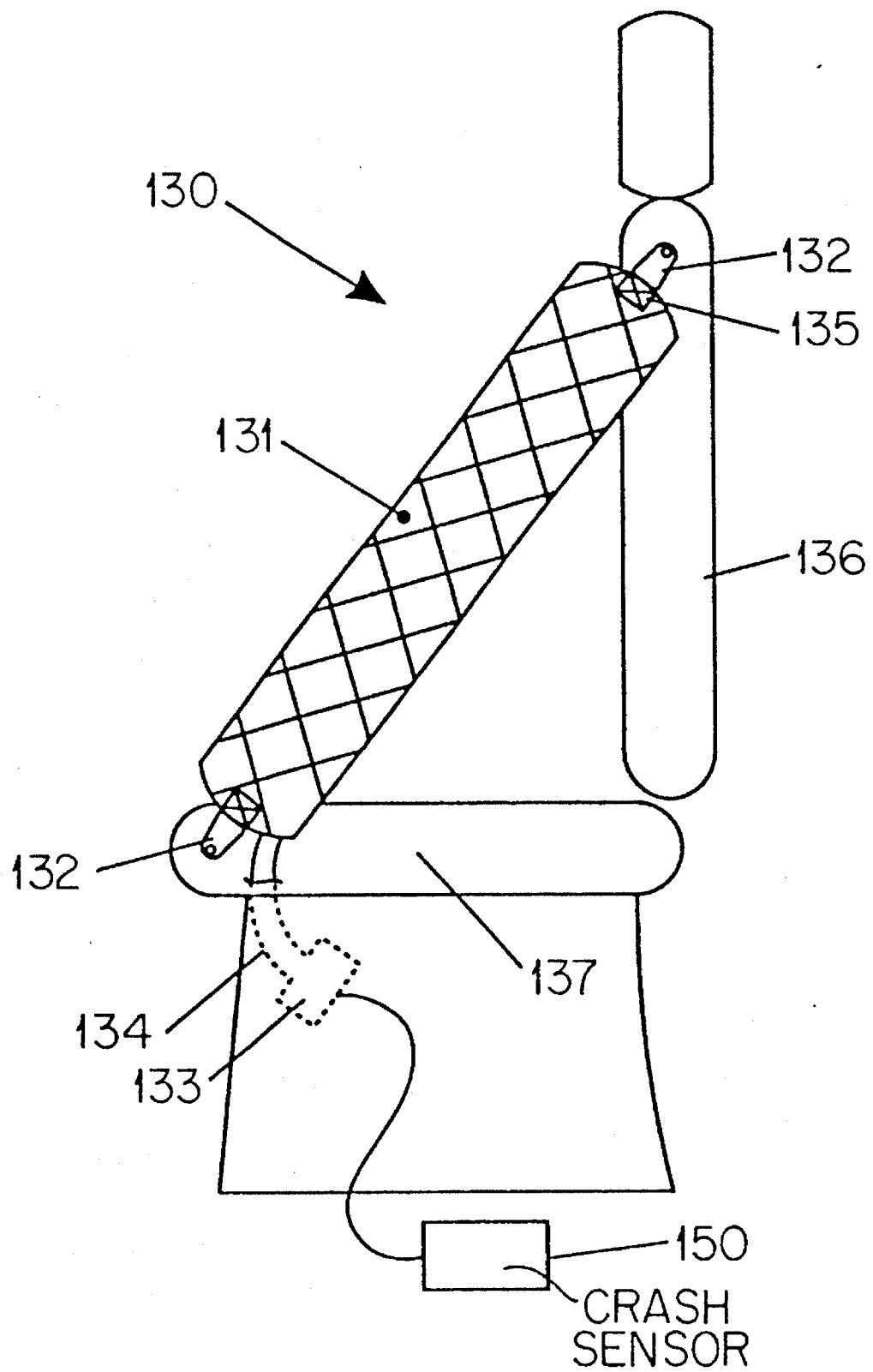
FIG. 2b is a side view of the present invention subsequent to inflation.
Figure 2C:
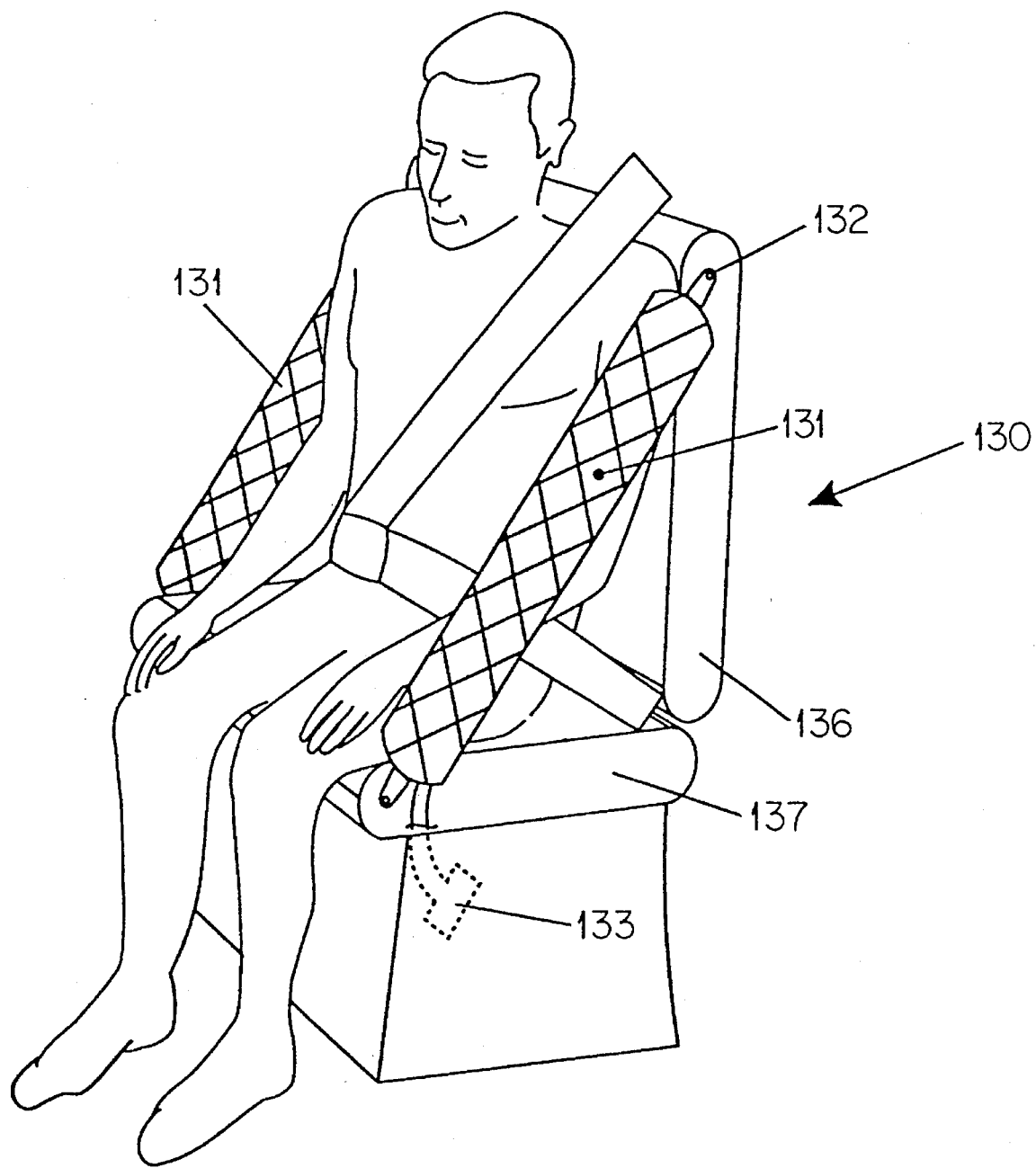
FIG. 2c is a perspective view of the present invention subsequent to inflation.

The preferred embodiment of the present invention is shown in FIGS. 2a–2c. FIG. 2a shows the present invention prior to inflation as it would be installed in a typical automobile seat. FIGS. 2b and 2c show the present invention subsequent to inflation. FIG. 2c shows the present invention, after deployment, with respect to a seated occupant.

The principal components of the torso protection system 130 is a pair of braided tubes 131 which are similar to the braided tubes disclosed U.S. Pat. No. 5,322,322, and U.S. patent application Ser. No. 08/181,768, filed Jan. 21, 1994, which are incorporated by reference herein. Braided tube 131 is shown in detail in FIGS. 3a and 3b. Each braided tube 131 is made of continuous high-strength fibers that may or may not be impregnated with elastomeric material, such as silicone rubber. Typical fiber materials include Kevlar™, aramid nylon, Dacron™ (polyethylene terephthalate) and polyester fibers. In the uninflated state, shown in FIG. 3a, braided tube 131 is elongated with its woven fibers forming clockwise and counterclockwise spirals which intersect at obtuse and acute angles at the fiber crossing points 138. For the sake of convenience and clarity, the angles which are acute in FIG. 3a (which would be bisected by a line parallel to the longitudinal axis of the braided tube) will be termed the longitudinal angles. The angles which are obtuse in FIG. 3a (which would be bisected by a line parallel to the circumference of the braided tube) will be termed the circumferential angles. Angle 201 in FIG. 3a is a longitudinal angle, and angle 202 in FIG. 3a is a circumferential angle.

The fibers in the braided tube form clockwise and counterclockwise spirals both prior to inflation, and subsequent to inflation. Prior to inflation, the spirals are stretched-out longitudinally, and have a relatively small diameter. Subsequent to inflation, the spirals are closer together longitudinally, and have a relatively larger diameter. This occurs because, when the tube is inflated, the tube fibers seek an orientation that allows a larger volume within the tube. This clockwise/counterclockwise spiral construction of the braided tube results in a tube whose contraction upon inflation is proportional to its length, i.e., if $L_p$ is the length of the braided tube prior to inflation, and $L_s$ is the length of the braided tube subsequent to inflation, the contraction $\Delta L$ of the braided tube as a result of inflation is given by:

$$\Delta L = L_p - L_s$$

FIG. 3b shows that as it inflates, braided tube 131 shortens in length, while its diameter increases. The braid fibers ultimately seek an orientation in which the longitudinal angles increase substantially as the tube diameter increases. As the tube diameter increases, the tube length decreases. If the tube were unconstrained, its length would decrease by as much as 50%. The preferred range for unconstrained decrease of the tube length is 10–50%.

The uninflated braided tube typically has a longitudinal angle of 30° to 70°. Because the fibers will naturally seek a longitudinal angle of 110°, the optimal angle after inflation is approximately 100°, although the useful range for the longitudinal angle after inflation is from 50° (when the uninflated longitudinal angle is low) up to 110°. Preferably, the longitudinal angles increase by at least 10° upon inflation.

FIGS. 2a–2c show how braided tubes 131 are installed in the seat of a vehicle. Each seat is equipped with two braided tubes 131, one on each side of the seat. Each braided tube end is connected, preferably by stitching, to an attachment strap 135. For each tube, one attachment strap 135 is attached to the upper portion of the side edge of the seat back 136 by a pivotable mount 132. The other attachment strap 135 is attached to the frontal portion of the side edge of the seat pan 137 by a second pivotable mount 132. Each braided tube 131 has an associated gas generator 133 that is preferably mounted inside the seat base to protect it from impacts and to dampen the noise it produces when activated. Thermally resistant tubing 134 provides a fluid path from each gas generator 133 to its respective braided tube 131.

In the uninflated state braided tube 131 is flexible. Thus it conforms to the contours of the side edge of seat back 136 and seat pan 137, as shown in FIG. 2a. Braided tube 131 is installed with a sufficient amount of slack so as to enable seat back 136 to adjust to a full range of positions. It is preferably concealed by a cover, such as a protective sleeve having a weak seam. It may be externally attached to the seat structure, or it may be externally or internally integrated into the seat structure as part of the seat fabric or trim (as shown in FIG. 2d).

Figure 2D:
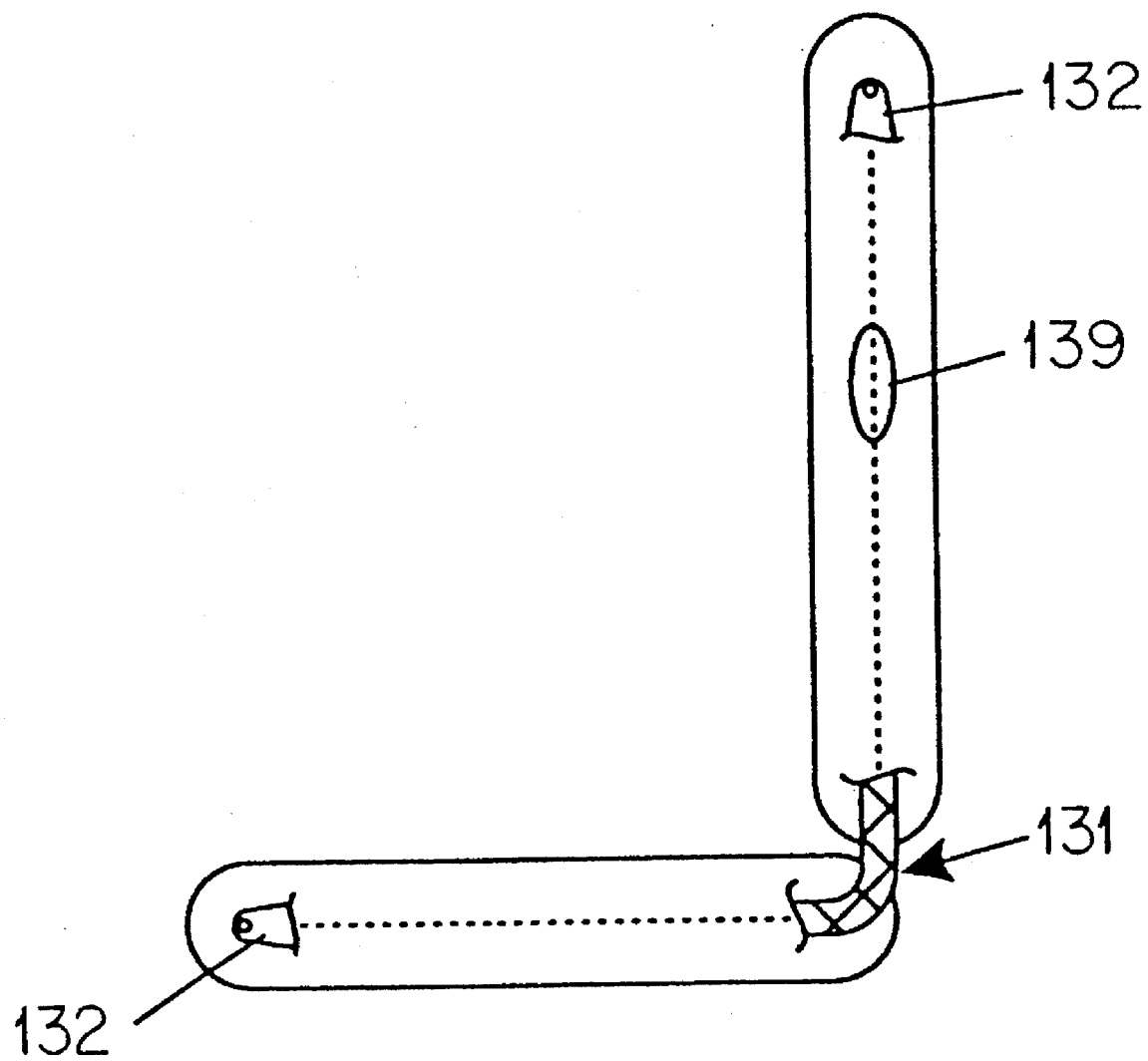
FIG. 2d shows an alternative preferred method for stowing the uninflated braided tube in which the braided tube is largely concealed by the covers of the seat back and the seat pan.

FIG. 2d shows an alternative preferred method for stowing the uninflated braided tube 131 in which the tube is largely concealed within seat back 136 and seat pan 137. A portion of braided tube 131 which is covered by a protective sleeve can be seen where it transitions from seat back 136 to seat pan 137. In this case, braided tube 131 deploys from within the seat structure by rupturing a weak seam 139 in the seat cover as it inflates. Pivotable mounts 132 (shown in FIGS. 2a–2c) may or may not be concealed by a fabric or material cover or may be integrated into the seat structure.

When a collision occurs, a crash sensor 150 (shown in FIG. 2b), electrically connected to gas generator 133, sends a signal to the initiator in gas generator 133. The initiator then ignites the generator propellant, thus producing a gas that inflates braided tube 131. As gas flows into the chamber of braided tube 131, the internal pressure increases the tube diameter and decreases the tube length, as discussed above. However, pivotable mounts 132 prevent the ends of braided tube 131 from moving closer together. This forces braided tubes 131 to pull themselves out of their stowed position along (or inside of) the side of seat back 136 and seat pan 137. Pivotable mounts 132 then pivot inward toward the side areas of the seat. Braided tubes 131 inflate approximately simultaneously. When they are fully inflated, they form straight lines between pivotable mounts 132, as shown in FIGS. 2b–2d. A typical braided tube 131 has a preferred inflated diameter of approximately 3 to 6 inches and a relative internal pressure of about 2 to 5 bars (3 to 6 bars absolute pressure).

In the preferred embodiment of the invention, the "natural length" or unconstrained length of braided tube 131 after inflation is less than the straight-line distance between pivotable mounts 132. Thus, pivotable mounts 132 prevent the shortening of braided tube 131, i.e., the tube after inflation and deployment is under a tensile load imposed by pivotable mounts 132.

FIG. 2c shows torso protection system 130 in the inflated state with braided tubes 131 deployed on either side of a vehicle occupant. Braided tubes 131 cushion the torso from direct impact with the interior side components of a vehicle and restrict the lateral motion of the torso to reduce the extent and severity of injuries suffered by struck-side and opposite-side occupants during side impact accidents, oblique impact accidents, and rollover accidents.

The gas generator used in the invention are preferably similar to those currently used in automotive air bags in Europe, such as the gas generator used in the Livbag "Euroflator" air bag. The inflatable tubes preferred for this invention must functionally inflate to pressures of approximately 2 bars relative pressure within 10 to 20 milliseconds (3 bars absolute pressure) and must fully inflate to the designated pressure within 25 to 30 milliseconds.

Figure 4A:
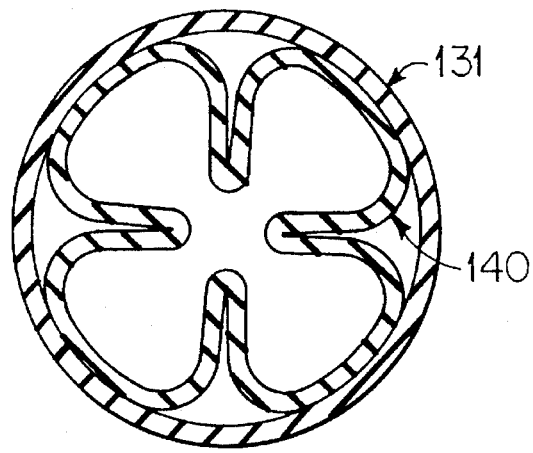
FIG. 4a is a cross-sectional view of a first preferred internal embodiment of the braided tube of the present invention having an inner bladder.
Figure 4B:
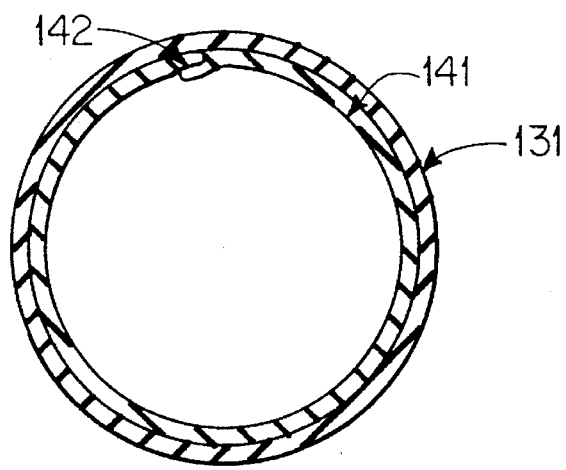
FIG. 4b is a cross-sectional view of a second preferred internal embodiment of the braided tube of the present invention having a seamed inner bladder.
Figure 4C:
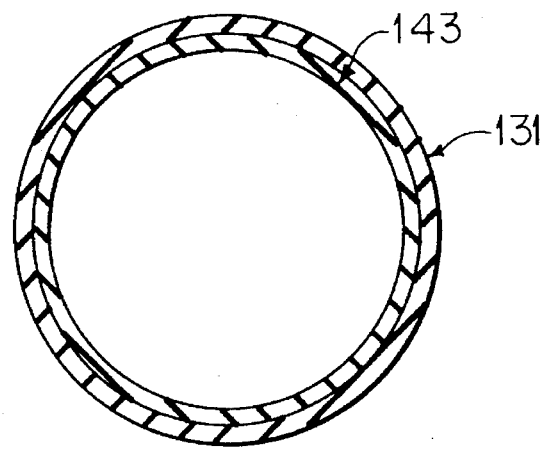
FIG. 4c is a cross-sectional view of a third preferred internal embodiment of the braided tube of the present invention having a seamless inner bladder.

In order to provide superior gas retention the braided tube 131 may contain an inner bladder member. FIGS. 4a–4c show cross sectional views of three preferred internal embodiments of braided tube 131 of the present invention. As shown in FIG. 4a, the first preferred internal embodiment of braided tube 131 includes an inner bladder 140 that is made of gas-retentive fabric or material, such as a material or fabric singly or doubly coated with silicone, neoprene, urethane, or other appropriate elastomers. Inner bladder 140 can be attached to the inner surface of braided tube 131 by adhesive bonding in several places. Portions of inner bladder 140 may be reinforced with one or more layers of material, such as elastomeric material, to provide additional thermal resistance to the gas generator's output flow. Inner bladder 140 is fluidly connected to gas generator 133 (shown in FIGS. 2a and 2b) by thermally resistant tubing 134.

Braided tube 131 is inflated by fully or partially inflating inner bladder 140. Specifically, the generated gas inflates inner bladder 140, thus inflating braided tube 131. Due to diameter restrictions imposed by the high-strength fibers of braided tube 131, inner bladder 140 may or may not be permitted to fully inflate. Inner bladder 140 may or may not include a seam running the length of bladder 140.

FIG. 4b shows a second preferred internal embodiment of braided tube 131 of the present invention. This internal embodiment is similar to the first preferred internal embodiment, but uses a seamed inner bladder 141. Seamed inner bladder 141 is constructed of one or more layers of gas-retentive elastomeric material, preferably silicone, with a bonded seam 142 running the length of the bladder. Unlike the inner bladder of the first embodiment, seamed inner bladder 141 is uniformly bonded to the inner surface of braided tube 131 by adhesive (not shown).

A third preferred internal embodiment of braided tube 131 of the present invention is shown in FIG. 4c. This internal embodiment is similar to the second preferred internal embodiment, but uses a seamless inner bladder 143 instead of a bladder with a seam.

Figure 5:
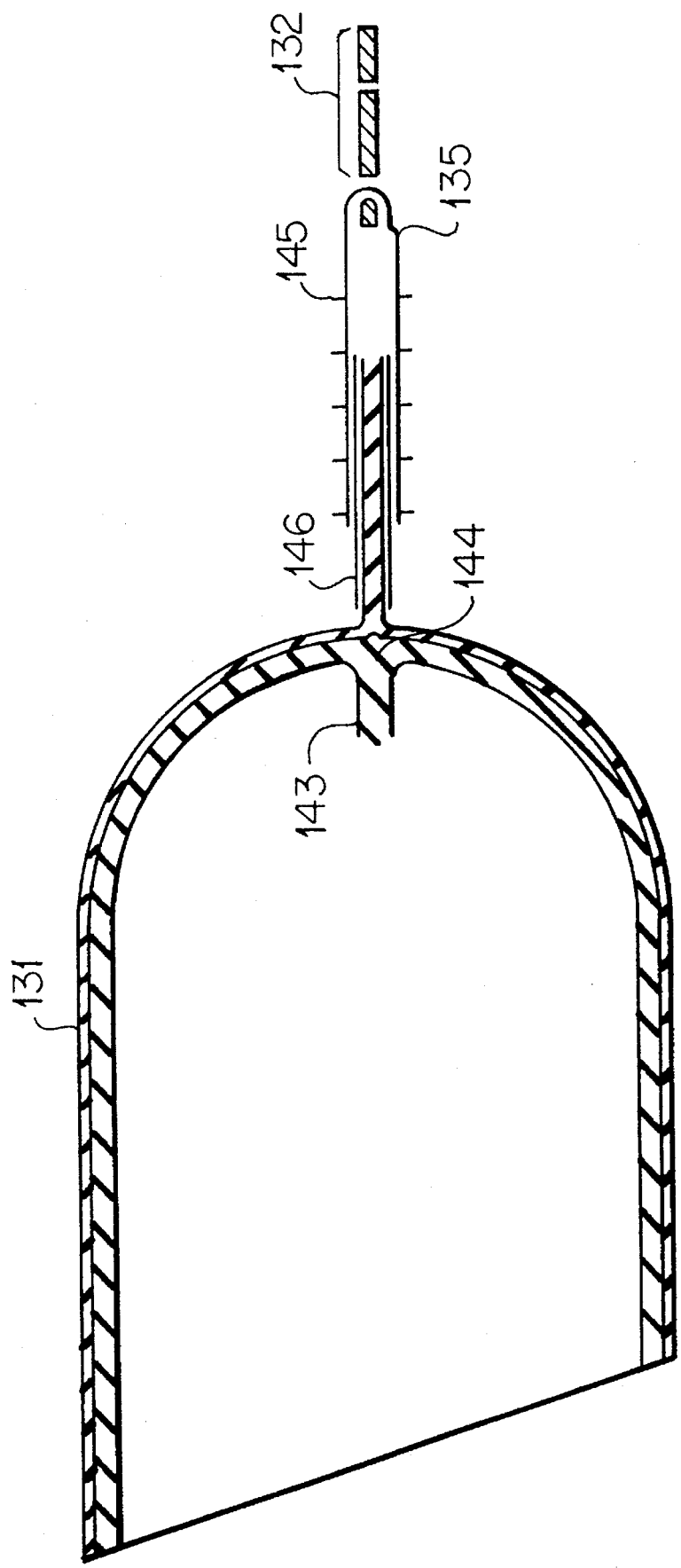
FIG. 5 shows an enlarged, cross-sectional side view of a preferred method of sealing and finishing the ends of the braided tube of the present invention.

The preferred method for sealing and finishing the ends of braided tube 131 of the present invention is shown in FIG. 5. FIG. 5 shows the side view of an enlarged cross-section of an end portion of braided tube 131. Braided tube 131 is shown in its inflated state. It includes inner bladder 143. However, inner bladders 140 or 141 (shown in FIGS. 4a and 4b, respectively) can be substituted in place of bladder 143.

As shown in FIG. 5, the ends of internal bladder 143 are turned inward and flattened, essentially forming an upper and lower layer that are sealed together by adhesive 144. The ends of braided tube 131 are brought together and flattened, essentially forming an upper and lower surface which are bounded together by stitching 145. The end of braided tube 131 is preferably wrapped with one or more layers of reinforcing fabric tape 146 to prevent fraying. The wrapped tube end is then stitched to attachment strap 135.

The preferred closure and finishing method shown in FIG. 5 helps braided tube 131 maintain an essentially "air-tight" character and provides adequate load transmission between braided tube 131 and the seat structure.

The foregoing disclosure of the preferred embodiments of the invention has been presented for the purposes of illustration and description. It is not intended to be exhaustive or to limit the invention to the precise forms disclosed. In particular, the present invention may be used in land, sea or air vehicles, as well as in automobiles. For example the present invention may be used in trains, trucks, buses, vans, boats, ships, and aircraft. Many variations and modifications of the embodiments described herein will be obvious to one of ordinary skill in the art in light of the above disclosure. The scope of the invention is to be defined only by the claims appended hereto, and by their equivalents.

What we claim is:

1. A protective apparatus for the occupants of a vehicle comprising:

(a) a vehicle seat having a seat back and a seat pan, said seat back having a first and second back side and said seat pan having a first and second pan side;

(b) a first protective sleeve attached along the first back side of the seat back and the first pan side of the seat pan, said protective sleeve having a weak seam along substantially the length of the first protective sleeve;

(c) a first inflatable braided tube of continuous high-strength fibers stowed within the first protective sleeve, said first inflatable braided tube having an upper end and a lower end, said upper end being attached to the seat back at a first position, and said lower end being attached to the seat pan at a second position, wherein the length of the first inflatable braided tube prior to inflation is substantially longer than the straight-line distance from the first position to the second position; and (d) gas generator means fluidly connected to the braided tube, wherein the continuous high-strength fibers form clockwise and counterclockwise spirals, relative to each other, prior to inflation, and upon inflation by gas generated by the gas generator means, the first inflatable braided tube increases its diameter and decreases its length, such that the tube ruptures the weak seam of the first protective sleeve and deploys under tension in a substantially straight line between the first and second positions in the vehicle, and forms a semi-rigid member stretched under tension in a substantially straight line from the first position to the second position.

2. The protective apparatus of claim 1, wherein, prior to inflation, the continuous fibers form longitudinal angles of 30° to 70° at the crossing points of the clockwise and the counterclockwise spirals, and, after inflation, the longitudinal angles increase by at least 10°, such that the longitudinal angles range from 50° to 110°, and such that the inflatable braided tube decreases its length by 10%–50%.

3. The protective apparatus of claim 2, wherein the upper end of the inflatable tube is pivotally attached to the seat back, and the lower end of the braided tube is pivotally attached to the seat pan.

4. The protective apparatus of claim 2, wherein the first inflatable braided tube comprises an inner bladder.

5. The protective apparatus of claim 4, wherein the inner bladder is fluidly connected to the gas generator means by thermally resistant tubing.

6. The protective apparatus of claim 4, wherein the inner bladder is a seamed bladder.

7. The protective apparatus of claim 1, wherein the continuous fibers form longitudinal angles at the crossing points of the clockwise and counterclockwise spirals, and the longitudinal angles after inflation are approximately 100°.

8. The protective apparatus of claim 1, further comprising a crash sensor electrically connected to the gas generator means.

9. The protective apparatus of claim 1, further comprising:

(e) a second protective sleeve attached along the second back side of the seat back and the second pan side of the seat pan, said second protective sleeve having a weak seam along substantially the length of the second protective sleeve;

(f) a second inflatable braided tube of continuous high-strength fibers stowed within the protective sleeve, said second inflatable braided tube having an upper end and a lower end, said upper end being attached to the seat back at a third position, and said lower end being attached to the seat pan at a fourth position, wherein the length of the second inflatable braided tube prior to inflation is substantially longer than the straight-line distance from the third position to the fourth position, and wherein the gas generator means is fluidly connected to the second inflatable braided tube, wherein the continuous high-strength fibers form spirals prior to inflation, and upon inflation by gas generated by the gas generator means, the second inflatable braided tube increases its diameter and decreases its length, such that the second inflatable braided tube deploys under tension in a substantially straight line between the third and fourth positions, and forms a semi-rigid member stretched under tension in a substantially straight line from the third position to the fourth position.

10. The protective apparatus of claim 9, wherein the first and second inflatable braided tubes comprise an inner bladder.

11. A safety system comprising:

(a) a first and a second inflatable braided tube, each tube having an upper end and a lower end;

(b) a vehicle seat having a seat back and a seat pan, the upper end of the first inflatable braided tube being pivotally mounted to the seat back at a first position, the lower end of the first inflatable braided tube being pivotally mounted to the seat pan at a second position, the upper end of the second inflatable braided tube being pivotally mounted to the seat back at a third position, and the lower end of the second inflatable braided tube being pivotally mounted to the seat pan at a fourth position;

(c) means for generating gas fluidly connected to the first and second inflatable braided tube;

(d) crash sensor means connected to the means for generating gas, said crash sensor means being set to initiate generation of gas in the tube upon detecting an impact, wherein the first and second braided tubes in their uninflated state are substantially longer than the straight-line distance between the first and second positions, and the third and fourth positions, respectively, and wherein upon inflation, the inflatable braided tubes increase their diameter and decrease their length substantially such the first tube deploys under tension in a substantially straight line between the first and second positions, and the second tube deploys in a substantially straight line between the third and fourth positions, thus forming a pair of semi-rigid members stretched in a substantially straight line on either side of the seat.

12. The safety system of claim 11, wherein the first and second inflatable braided tubes comprise continuous fibers forming spirals, the continuous fibers crossing each other at fiber crossing points, such that when the braided tubes are in their uninflated state, the continuous fibers form acute longitudinal angles at angles of 30° to 70° at the fiber crossing points, and as the braided tubes are inflated, the longitudinal angles increase by at least 10°, to 50° to 110°, causing the length of the inflatable braided tubes to decrease by at least 10%.

13. The safety system of claim 12, wherein, upon inflation, the longitudinal angles increase to approximately 100°, and the inflatable braided tubes decrease their length by 10% to 50%.

14. The safety system of claim 12, wherein the continuous fibers are selected from aramid, nylon and Dacron™ fibers.

15. The safety system of claim 11, wherein the inflatable braided tubes can be fully inflated by filling the braided tubes with gas to a relative internal pressure of approximately 2–5 bars.

16. The safety system of claim 11, wherein the inflatable braided tubes comprise an inner bladder.

17. The safety system of claim 16, wherein the ends of the inner bladder are brought together and flattened, and wherein the flattened ends of the inner bladder are sealed.

18. The safety system of claim 11, wherein the first inflatable braided tube is routed through a first protective sleeve attached to the seat back and the seat pan, and the second inflatable braided tube is routed though a second protective sleeve attached to the seat back and the seat pan.

19. The safety system of claim 18, wherein the first and second protective sleeves have a weak seam, said weak seam being designed to rupture upon inflation of the braided tubes, thus allowing deployment of the braided tubes.

20. The safety system of claim 18, wherein the first and second protective sleeves are integrated into the seat back and the seat pan.

21. A method for protecting the occupants of a vehicle comprising:

(a) providing a safety system comprised of:
  (i) a first and a second inflatable braided tube, each tube having an upper end and a lower end;
  (ii) a vehicle seat having a seat back and a seat pan, the upper end of the first inflatable braided tube being pivotally mounted to the seat back at a first position, the lower end of the first inflatable braided tube being pivotally mounted to the seat pan at a second position, the upper end of the second inflatable braided tube being pivotally mounted to the seat back at a third position, and the lower end of the second inflatable braided tube being pivotally mounted to the seat pan at a fourth position;
  (iii) gas generating means fluidly connected to the first and second inflatable braided tubes;
  (iv) crash sensor means connected to the means for generating gas,
  wherein the first and second braided tubes in their uninflated state are substantially longer than the straight-line distance between the first and second positions, and the third and fourth positions, respectively, (b) detecting an impact;

(c) initiating the gas generator means and generating a gas which inflates the first and second braided tubes, increasing the diameter of the first and second braided tubes and decreasing the length of the first and second inflatable braided tubes, such that the first inflated braided tube deploys as a semi-rigid member in a substantially straight line from the first position to the second position, and the second inflated braided tube deploys as a semi-rigid member in a substantially straight line from the third position to the fourth position.

22. The method of claim 21, wherein the first and second inflatable braided tubes each comprise an inner bladder.

23. The method of claim 22, wherein the inner bladder is a seamed bladder.

24. The method of claim 22, wherein the inner bladder is uniformly bonded to the inner surface of the inflatable braided tube.

25. The method of claim 21, wherein the first and second inflatable braided tubes comprise continuous fibers forming spirals, the continuous fibers crossing each other at fiber crossing points, such that when the braided tubes are in their uninflated state, the continuous fibers form acute longitudinal angles at the fiber crossing points, and as the braided tube are inflated, the longitudinal angles increase at least 10°, to 50° to 110°, causing the length of the inflatable braided tubes to decrease by at least 10%.

26. The method of claim 25, wherein prior to inflation the longitudinal angles range from 30° to 70°.

27. The method of claim 25, wherein after inflation the longitudinal angles are approximately 100°.

28. The method of claim 21, wherein the first inflatable braided tube is stowed in a first protective sleeve attached to the seat back and the seat pan, and the second inflatable braided tube is stowed in a second protective sleeve attached to the seat back and the seat pan, said first and second protective sleeves each having a weak seam, wherein the first and second braided tubes deploy by rupturing the weak seams in the first and second protective sleeves, respectively.

29. The method of claim 28, wherein the first and second protective sleeves are integrated into the seat back and the seat pan.

30. A vehicle seat having a seat back and a seat pan comprising an inflatable braided tube of continuous fibers, said inflatable braided tube being stowed along a side of the seat back and a side of the seat pan, said fibers forming clockwise and counterclockwise spirals, relative to each other, said clockwise spirals intersecting said counterclockwise spirals at crossing points, thus forming acute longitudinal angles at the crossing points, wherein, upon inflation, the inflatable braided tube decreases in length, and the decrease in length of the inflatable braided tube is proportional to the length of the inflatable braided tube prior to inflation.

31. The vehicle seat of claim 30, wherein prior to inflation the longitudinal angles range from 30° to 70°, and subsequent to inflation the longitudinal angles are obtuse angles.

32. The vehicle seat of claim 31, wherein subsequent to inflation the longitudinal angles are approximately 100°.

33. The vehicle seat of claim 30, wherein the inflatable braided tube comprises an inner bladder.

* * * * *